United States Patent
Iwasaki

(10) Patent No.: US 6,421,319 B1
(45) Date of Patent: Jul. 16, 2002

(54) NETWORK TRAFFIC MONITORING SYSTEM

(75) Inventor: Junko Iwasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/181,662

(22) Filed: Oct. 29, 1998

(30) Foreign Application Priority Data

Oct. 31, 1997 (JP) .............................................. 9-301068

(51) Int. Cl.$^7$ .............................................. G01R 31/08
(52) U.S. Cl. ..................... 370/230; 370/230.1; 709/224
(58) Field of Search ................. 370/401, 402, 370/420, 421, 229, 230, 230.1, 231, 232, 233, 234, 235; 709/223, 224, 225, 235; 345/732, 734, 735, 736, 737

(56) References Cited

U.S. PATENT DOCUMENTS

| | | | | |
|---|---|---|---|---|
| 5,706,436 A | * | 1/1998 | Lewis | 709/235 |
| 6,061,725 A | * | 5/2000 | Schwaller | 709/224 |
| 6,209,033 B1 | * | 3/2001 | Datta | 709/224 |
| 6,292,465 B1 | * | 9/2001 | Vaid | 370/230 |

FOREIGN PATENT DOCUMENTS

| | | |
|---|---|---|
| JP | 5-75621 | 3/1993 |
| JP | 6-164583 | 6/1994 |
| JP | 6-318944 | 11/1994 |
| JP | 7-162512 | 6/1995 |
| JP | 8-181711 | 7/1996 |
| JP | 8-265317 | 10/1996 |
| JP | 8-288945 | 11/1996 |
| JP | 9-135261 | 5/1997 |
| JP | 9-191327 | 7/1997 |

OTHER PUBLICATIONS

Japanese Office Action, dated Sep. 5, 2001, with English language translation of Japanese Examiner's comments.
O. Miura, Internetwork LAN, p. 47–49, 1994.
Japanese Office Action, dated Jul. 18, 2000, with English language translation of Japanese Examiner's comments.

* cited by examiner

Primary Examiner—David Vincent
Assistant Examiner—Ricardo M. Pizarro
(74) Attorney, Agent, or Firm—Whitham, Curtis & Christofferson, PC

(57) ABSTRACT

A network traffic monitoring system includes a router, a terminal adaptor, a digital service unit, a frame relay/leased network, a traffic monitoring apparatus, and a monitor. A subscriber line is connected to the router. The terminal adaptor interfaces the router to the network side. The digital service unit is connected to the terminal adaptor through an I interface. The frame relay/leased network is made up of at least one of a higher-speed relay router and a switching unit and transmission lines. The traffic monitoring apparatus monitors the internet traffic on a physical line between the terminal adaptor and the digital service unit. The monitor controls the traffic monitoring means to start and stop totalization processing, sets a subnet mask for determining a totalization unit, and acquires traffic information as a totalization result from the traffic monitoring apparatus.

8 Claims, 4 Drawing Sheets

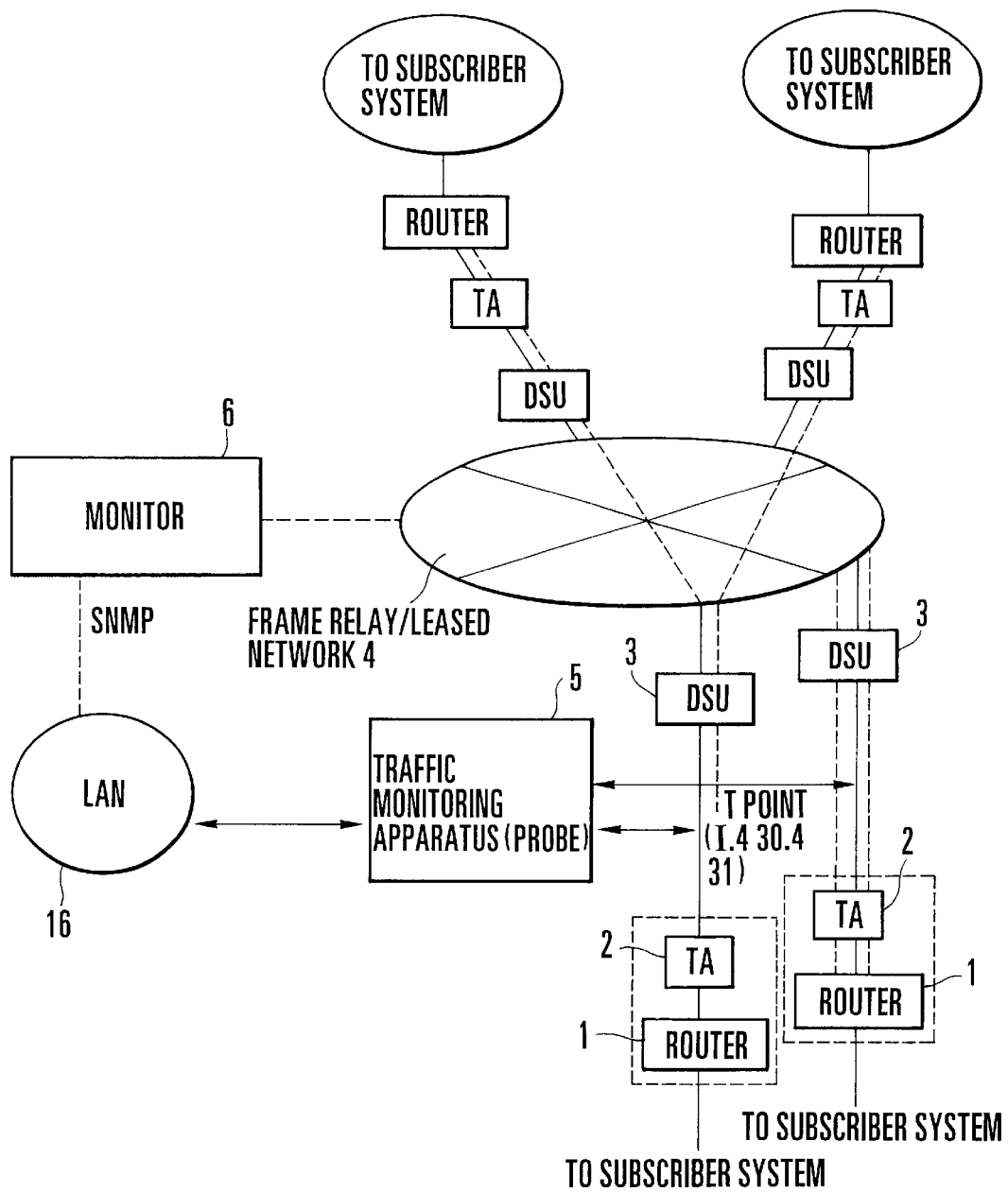
F I G. 1

NETWORK TRAFFIC MONITORING SYSTEM

BACKGROUND OF THE INVENTION

The present invention relates to a network traffic monitoring system applied to a wide area network.

In a conventional traffic monitoring apparatus applied to a LAN (Local Area Network), source IP (Internet Protocol) addresses and destination IP addresses are read out, and a totalization table associated with the traffic transmitted with combinations of source and destination IP addresses is generated, thus performing data collection. For example, such a conventional technique is disclosed in Japanese Patent Laid-Open Nos. 5-075621, 6-318944, 8-181711, and 9-191327.

When the above conventional scheme is to be applied to a wide area network (WAN) without any modification, the following problems arise.

First, in a WAN, an enormous number of combinations of source and destination IP addresses will be collected. For example, in a WAN including n hosts, the number of combinations of source and destination IP addresses for communication between the IP hosts within a unit collection time may become $n(n-1)$ in the worst case depending on the network arrangement. The traffic trend in a large-scale WAN cannot be properly analyzed by using IP host communication information alone.

Second, in a traffic monitoring apparatus, a large memory is required to store combinations of source and destination IP addresses, and a long CPU processing time is required to search the table. In addition, the performance of the monitor deteriorates as the amounts of data collected and analyzed/displayed increase.

SUMMARY OF THE INVENTION

It is an object of the present invention to provide a network traffic monitoring system which can collect statistic information in units of subnets and totalize/monitor the traffic suitable for a WAN.

In order to achieve the above object, according to the present invention, there is provided a network traffic monitoring system comprising a router to which a subscriber line is connected, a terminal adaptor for interfacing the router to a network side, a digital service unit connected to the terminal adaptor through an I interface, a frame relay/leased network made up of at least one of a higher-speed relay router and a switching unit and transmission lines, a traffic monitoring means for monitoring internet traffic on a physical line between the terminal adaptor and the digital service unit, and monitor means for controlling the traffic monitoring means to start and stop totalization processing, setting a subnet mask for determining a totalization unit, and acquiring traffic information as a totalization result from the traffic monitoring means.

BRIEF DESCRIPTION OF THE DRAWINGS

FIG. 1 is a block diagram showing the schematic arrangement of a network traffic monitoring system applied to a wide area network (WAN) according to an embodiment of the present invention;

DESCRIPTION OF THE PREFERRED EMBODIMENTS

The present invention will be described in detail below with reference to the accompanying drawings.

FIG. 1 schematically shows a network traffic monitoring system according to an embodiment of the present invention. A case wherein this system is applied to a wide area network will be described. Referring to FIG. 1, the traffic monitoring system includes routers 1 to which subscriber lines are connected, terminal adaptors (TAs) 2 for interfacing the routers 1 to the network side, digital service units (DSUs) 3 connected to the TAs 2 through I interfaces, a frame relay/leased network 4 composed of a higher-speed relay router, a switching unit, and transmission lines, a traffic monitoring apparatus 5 for monitoring the internet traffic through branch cables connected to the T points between the TAs and the DSUs, and a monitor 6 for controlling the traffic monitoring apparatus 5 to start/stop totalization processing, setting a subnet mask for determining a totalization unit, and acquiring traffic information as the totalization result obtained by the traffic monitoring apparatus 5 with a simple network management protocol (SNMP) through a LAN 16.

The traffic monitoring apparatus 5 and the monitor 6 are connected to each other through a management interface for exchanging control information and totalization result information.

Figure 2:
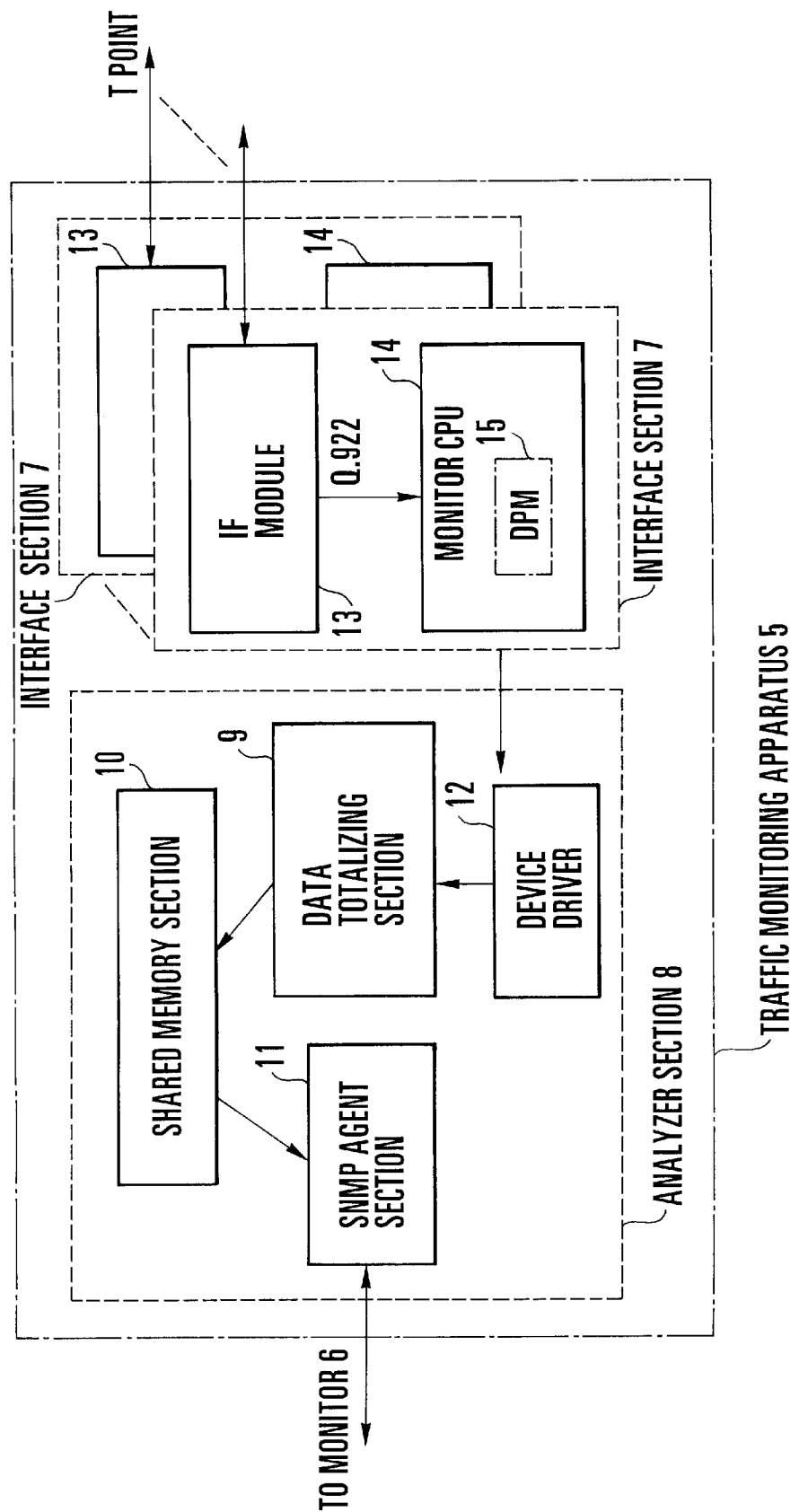
FIG. 2 is a block diagram showing a traffic monitoring apparatus in FIG. 1.

FIG. 2 shows the traffic monitoring apparatus 5 in FIG. 1.

Figure 3:
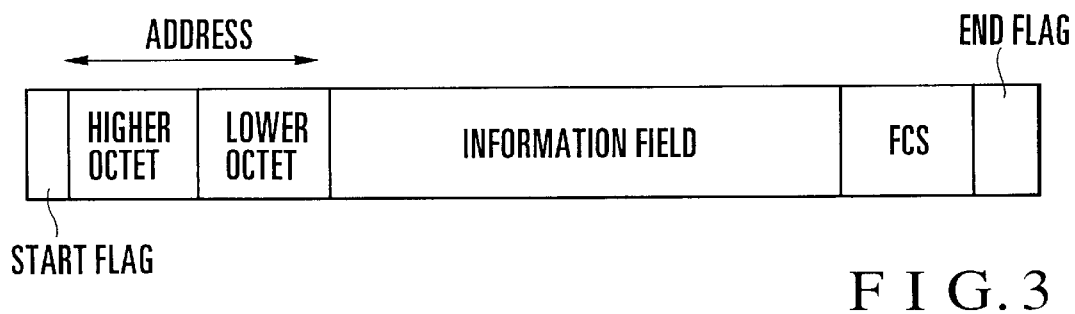
FIG. 3 is a view showing an example of a data link layer frame.

Referring to FIG. 2, the traffic monitoring apparatus 5 is made up of a plurality of interface sections 7 for monitoring the frame relay/leased network 4 between the TAs and the DSUs and extracting frame data from the physical layer in units of data line layer frames, e.g., Q. 922 frames shown in FIG. 3 or PPP frames, and an analyzer section 8 for analyzing/totalizing data link layer frames from the interface section 7 into network layer frames.

The Q. 922 frame has a frame format consisting of a start flag, an address (higher octet and lower octet), an information field, an FCS (Frame Check Sequence), and an end flag, as shown in FIG. 3.

Each interface section 7 includes an IF (interface) module 13 for monitoring the traffic between the T point and the I interface, and a monitor CPU (Central Processing Unit) 14 for controlling the monitoring operation of the IF module and outputting the monitoring result to the analyzer section 8. The monitor CPU 14 has a DPM (Dual Port Memory).

The analyzer section 8 includes a data totalizing section 9 for totalizing source and destination IP addresses in units of IP address pairs and totalizing statistic information between subnet address pairs of source and destination subnet addresses, a shared memory section 10 for storing the totalization result from the data totalizing section 9, an SNMP agent section 11 for performing control based on the monitor 6 and transmitting the totalization result, and a device driver 12 for driving the data totalizing section 9. The data totalizing section 9 has a counter (not shown) for counting in units of PVCs (Permanent Virtual Calls).

The traffic monitoring apparatus 5 can also be designed to monitor the traffic of a plurality of physical lines in two directions.

The operation of the above traffic monitoring system will be sequentially described next. In the traffic monitoring system of the present invention, a unit of data to be gathered can be set when the data of IP address pairs of source and destination IP addresses are to be collected.

1. When the monitor 6 is to request the traffic monitoring apparatus 5 to start data collection, the monitor 6 sets the mask bits of IP addresses to acquire the traffic volume between subnets.

In this case, the masks of IP addresses can be set in units of (255.255.255.0), (255.255.0.0), (255.0.0.0), or the like or mask bits can be set in units of bits.

2. Upon reception of a mask value, the traffic monitoring apparatus 5 stores it in the analyzer section 8 in FIG. 2, and starts collecting traffic data through the interface section 7.

3. The traffic monitoring apparatus 5 monitors physical layer frames flowing on a frame relay/leased network through the interface section 7, and extracts data in units of data link layer frames (the Q. 922 frame shown in FIG. 3 for the frame relay; and the PPP frame for the leased network, in particular) from a start/end flag position. The traffic monitoring apparatus 5 then transfers the data from the interface section 7 to the analyzer section 8.

4. The analyzer section 8 analyzes each transferred data link layer frame, and analyzes the internet traffic on the layer 3/4/application level on the basis of the value of the information field.

More specifically, if the frame corresponds to the frame relay line, the network layer protocol of the Q. 922 frame on the data link layer is identified on the basis of the identifier (DLCI) of the PVC and the value (NLPID or the like) of the information field. If the frame is IP data, the source and destination IP addresses are read from the header information.

5. If no subnet mask is set, totalization tables are generated in units of combinations of source and destination IP addresses, and statistic information about IP address pairs of source and destination IP addresses are collected.

In this case, for example, the contents of each totalization table include transmission directions, PVC identifiers (DLCIs), protocol types, source and destination IP addresses, collection start times, the number of octets, the number of packets, and the like.

6. If a subnet mask is set, traffic data are totalized in units of subnets by net-masking source and destination IP addresses, and the totalization results are formed into a totalization table. That is, the source and destination subnet addresses are collected and totalized by ANDing the set subnet mask and the source and destination IP addresses of IP headers.

7. The totalization table is temporarily stored in the shared memory section 10 of the traffic monitoring apparatus 5. The SNMP agent section 11 transmits the totalization data to the monitor 6.

8. The monitor 6 analyzes and displays the traffic statistic information about the subnets.

With the above operation, the statistic information between subnets can be collected as well as the statistic information between points.

Totalization processing to be performed in units of subnets will be described next with reference to FIGS. 4 and 5.

Figure 4:
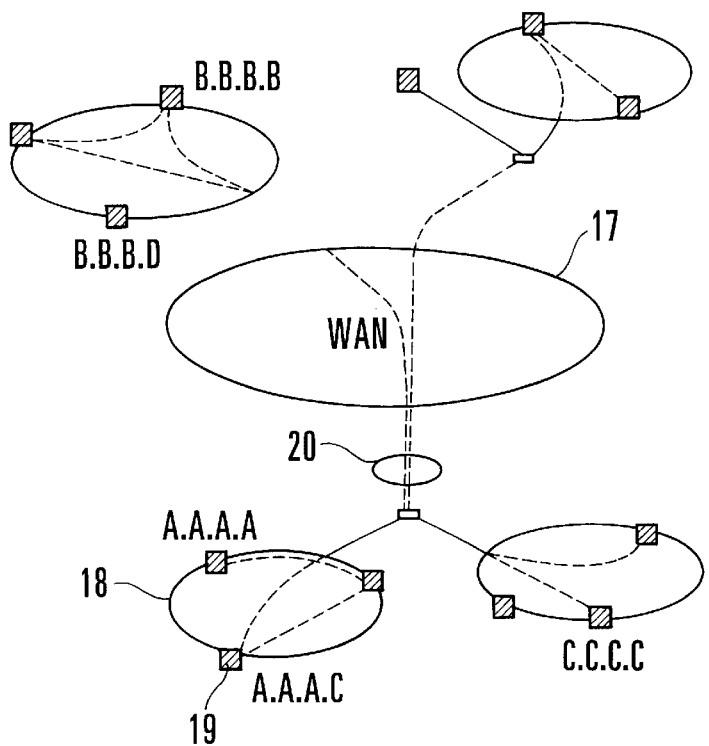
FIG. 4 is a view showing subnets, each having a plurality of IP hosts connected to the user side of a subscriber router.

Assume that a subnets 18 has a plurality of IP hosts 19 connected to the user side of the subscriber router, and communication data is sent between hosts with IP address "A.A.A.A" and IP address "B.B.B.B" and between hosts with IP address "A.A.A.C" and IP address "B.B.B.D", as shown in FIG. 4.

Figure 5:
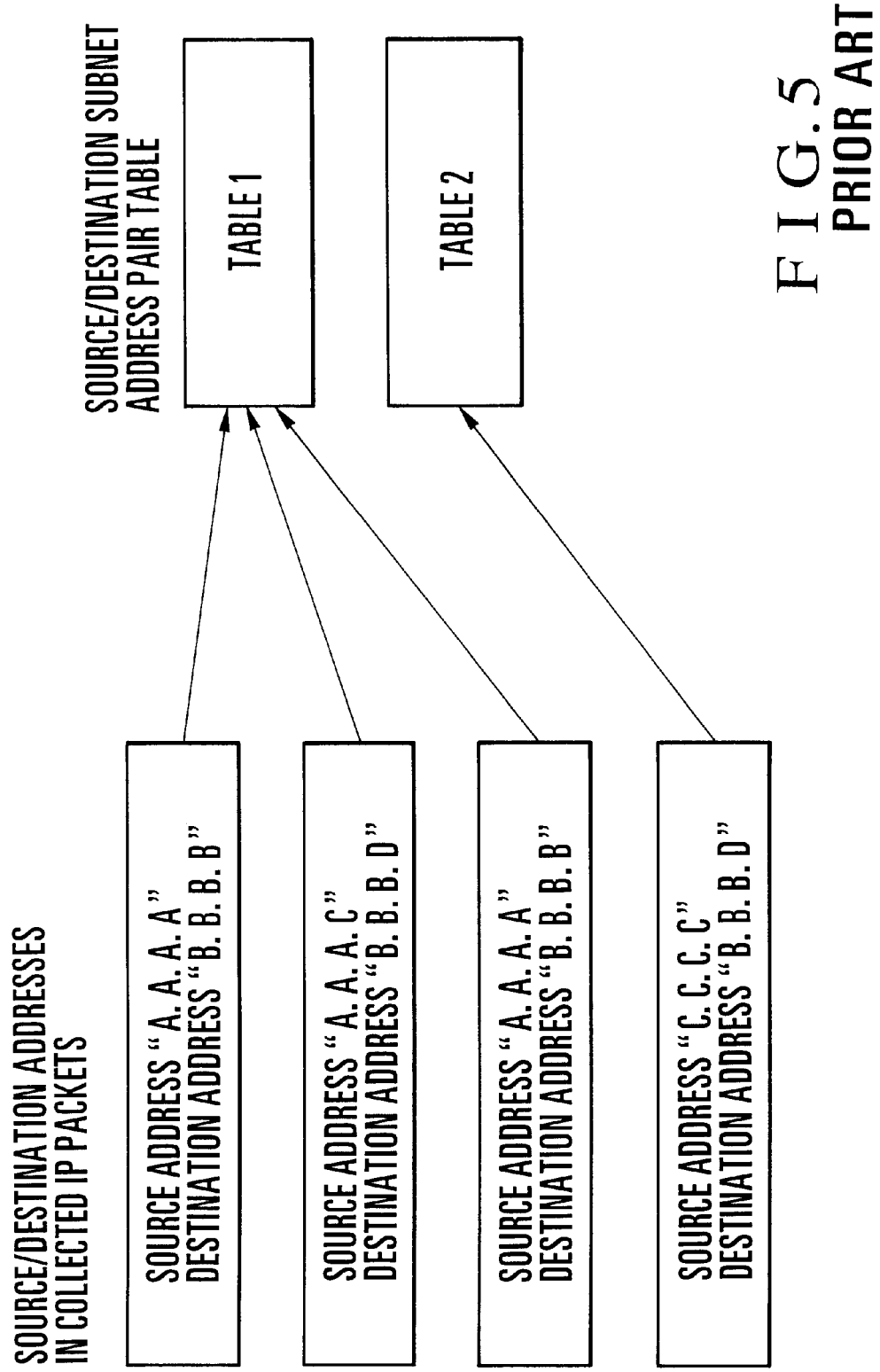
FIG. 5 is a view showing the relationship between collected frames and address pair tables in a case wherein IP addresses are net-masked with net mask values.

For example, FIG. 5 shows the relationship between collected frames and address pair tables in a case wherein the subnet address portions of the IP addresses are net-masked with the subnet mask value "255.255.255.0".

When the subnet address portions of the source/destination IP address pairs in the collected IP datagrams (IP heads and IP data) are net-masked, n address pairs of "A.A.A.A" and "B.B.B.B" and m address pairs of "A.A.A.C" and "B.B.B.D" are totalized (n+m) as combinations of "A.A.A.0" and "B.B.B.0" in single source/destination subnet address pair table 1. In this case, a combination of source address "C.C.C.C" and destination address "B.B.B.D" is totalized in source/destination subnet address pair table 2.

In addition, detailed traffic analysis can be performed by also measuring the traffic between source and destination IP addresses, as needed.

As has been described above, the present invention has the following effects.

In the network traffic monitoring system of the present invention, traffic information can be collected and totalized in units of subnets, instead of statistic information between points, by setting a data totalization unit in collecting source/destination IP address pair data. This allows execution of internet traffic trend analysis in a large-scale WAN.

In addition, statistic information can be collected in units of subnets, instead of statistic information between points, by net-masking source and destination IP addresses in totalizing IP packets. This makes it possible to totalize/monitor traffic in accordance with a WAN.

Furthermore, the memory capacities required for both the traffic monitoring apparatus and the monitor can be reduced, and their performance can be improved.

What is claimed is:

1. A network traffic monitoring system comprising:
    a router to which a subscriber line is connected;
    a terminal adaptor for interfacing said router to a network side;
    a digital service unit connected to said terminal adaptor through an I interface;
    a frame relay/leased network made up of at least one of a higher-speed relay router and a switching unit and transmission lines;
    a traffic monitoring means for monitoring internet traffic on a physical line between said terminal adaptor and said digital service unit; and
    monitor means for controlling said traffic monitoring means to start and stop totalization processing, setting a subnet mask for determining a totalization unit, and acquiring traffic information as a totalization result from said traffic monitoring means.

2. A system according to claim 1, wherein said traffic monitoring means is connected to a predetermined point between said terminal adaptor and said digital service unit through a branch cable.

3. A system according to claim 1, wherein said monitor means acquires the traffic information as the totalization result from said traffic monitoring means with a simple network monitoring protocol (SNMP).

4. A system according to claim 1, wherein said traffic monitoring means and said monitor means are connected to each other through a management interface for exchanging control information and totalization result information.

5. A system according to claim 1, wherein said traffic monitoring means monitors internet traffic on a plurality of physical lines between said terminal adaptor and said digital service unit in two directions.

6. A system according to claim 1, wherein said traffic monitoring means comprises:

interface means for monitoring said frame relay/leased network between said terminal adaptor and said digital service unit, and extracting frame data from a physical layer in units of data link layer frames on the basis of a monitoring result; and analyzer means for analyzing and totalizing a data link layer frames output from said interface means into network layer frames.

7. A system according to claim 1, wherein said analyzer means comprises:

data totalizing means for totalizing IP address pairs of source and destination IP addresses of IP (internet protocol) headers, and totalizing statistic information between subnet address pairs of source and destination subnet addresses upon subnet mask setting;

memory means for storing a totalization result from said data totalizing means; and SNMP agent means for performing control based on said monitor means and transmitting the totalization result stored in said memory means.

8. A system according to claim 7, wherein said data totalizing means reads out source and destination IP addresses of an IP header, and ANDs the subnet mask set by said monitor means and the source and destination IP addresses of the IP header, thereby acquiring source and destination subnet addresses.

* * * * *